United States Patent
Hartmann et al.

(10) Patent No.: US 9,062,540 B2
(45) Date of Patent: Jun. 23, 2015

(54) MISALIGNMENT COMPENSATION FOR DEEP READING AZIMUTHAL PROPAGATION RESISTIVITY

(75) Inventors: Andreas Hartmann, Niedersachsen (DE); Christian Fulda, Lower Saxony (DE); Hans-Martin Maurer, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 489 days.

(21) Appl. No.: 13/469,978

(22) Filed: May 11, 2012

(65) Prior Publication Data

US 2013/0301388 A1 Nov. 14, 2013

(51) Int. Cl.

| | |
|---|---|
| E21B 47/14 | (2006.01) |
| G01V 1/40 | (2006.01) |
| G01V 3/18 | (2006.01) |
| G01V 3/22 | (2006.01) |
| G01V 1/28 | (2006.01) |
| E21B 47/024 | (2006.01) |
| E21B 47/026 | (2006.01) |
| G01V 3/28 | (2006.01) |
| E21B 47/022 | (2012.01) |

(52) U.S. Cl.
CPC .............. *E21B 47/14* (2013.01); *E21B 47/024* (2013.01); *E21B 47/026* (2013.01); *G01V 3/18* (2013.01); *G01V 3/28* (2013.01); *E21B 47/022* (2013.01); *G01V 3/22* (2013.01); *G01V 1/28* (2013.01)

(58) Field of Classification Search
CPC ..... E21B 47/14; E21B 47/022; E21B 47/024; E21B 47/026; E21B 7/04; E21B 7/062; G01V 3/18; G01V 3/22; G01V 3/28; G01V 3/32

USPC ......................................... 367/81; 702/1, 6, 7
See application file for complete search history.

(56) References Cited

U.S. PATENT DOCUMENTS

| | | | |
|---|---|---|---|
| 6,147,496 A * | 11/2000 | Strack et al. .................. | 324/343 |
| 7,057,392 B2 | 6/2006 | Wang et al. | |
| 7,268,555 B1 | 9/2007 | Rabinovich et al. | |
| 7,333,891 B2 | 2/2008 | Rabinovich et al. | |
| 7,379,818 B2 | 5/2008 | Rabinovich et al. | |
| 7,414,407 B2 | 8/2008 | Wang et al. | |
| 7,483,793 B2 | 1/2009 | Wang et al. | |
| 7,894,990 B2 | 2/2011 | Wang et al. | |
| 8,286,729 B2 * | 10/2012 | Reckmann et al. ............. | 175/45 |
| 8,428,879 B2 * | 4/2013 | Ekseth et al. .................... | 702/7 |
| 2005/0150689 A1 * | 7/2005 | Jogi et al. ........................ | 175/45 |

(Continued)

*Primary Examiner* — Firman Backer
*Assistant Examiner* — Adnan Aziz
(74) *Attorney, Agent, or Firm* — Mossman Kumar & Tyler PC

(57) ABSTRACT

An apparatus and method for estimating a parameter of interest of an earth formation involving alignment information between receivers and their corresponding oriented transmitters. The method may include generating signals indicative responses to energy transmitted into an earth formation; estimating differences in alignment between transmitters and receivers; using the estimated differences in alignment to compensate for misalignment; and estimating a parameter of interest using the misalignment compensated signals. The apparatus may include a bottom hole assembly with one or more oriented transmitters, one or more oriented receivers, one or more alignment sensors, and at least one processor configured to compensate for misalignment using information about difference in alignment between the at least one oriented transmitter and at least one oriented receiver.

16 Claims, 7 Drawing Sheets

(56) References Cited

U.S. PATENT DOCUMENTS

| | | |
|---|---|---|
| 2005/0256644 A1* | 11/2005 | Xiao ................................ 702/7 |
| 2006/0106588 A1* | 5/2006 | Mitchell ........................ 703/10 |
| 2006/0125479 A1 | 6/2006 | Chemali et al. |
| 2006/0132129 A1 | 6/2006 | Edwards |
| 2007/0024286 A1 | 2/2007 | Wang |
| 2007/0239378 A1* | 10/2007 | Rabinovich et al. ............ 702/85 |
| 2007/0294035 A1 | 12/2007 | Rabinovich et al. |
| 2009/0205867 A1 | 8/2009 | Reckmann et al. |
| 2010/0082255 A1* | 4/2010 | Davydycheva et al. ........... 702/7 |
| 2011/0238312 A1* | 9/2011 | Seydoux et al. .................. 702/6 |
| 2012/0046865 A1 | 2/2012 | Heisig et al. |
| 2012/0105076 A1 | 5/2012 | Li et al. |
| 2013/0076526 A1* | 3/2013 | Schuberth et al. ......... 340/853.8 |
| 2013/0304384 A1* | 11/2013 | Rabinovich et al. .............. 702/6 |

\* cited by examiner

MISALIGNMENT COMPENSATION FOR DEEP READING AZIMUTHAL PROPAGATION RESISTIVITY

FIELD OF THE DISCLOSURE

This disclosure generally relates to exploration for hydrocarbons involving electrical investigations of a borehole penetrating an earth formation.

BACKGROUND OF THE DISCLOSURE

In downhole operations such as drilling, geosteering and measurement-while-drilling (MWD) operations, sensor devices are included with a borehole string that measure various parameters of a formation and/or a borehole. Such sensor devices are typically arranged to have a desired orientation or alignment, and resulting measurements are analyzed based on such alignments. In practice, such alignment often cannot be achieved to the precision desired. The misalignment can be caused by different factors such as limited accuracy of coil positioning during manufacturing or/and tool assembly as well as bending of the tool while logging. Navigating through an earth formation may result in sensor devices shifting from a desired alignment, including deformation of the carrier along which the sensor devices may be positioned. The bending effect can be significant for the deep reading azimuthal tools with large transmitter-receiver spacings.

SUMMARY OF THE DISCLOSURE

In aspects, the present disclosure is related to methods and apparatuses estimating at least one parameter of interest while compensating for alignment differences between oriented transmitters and receivers.

One embodiment according to the present disclosure includes a method of conducting logging operations in a borehole penetrating an earth formation, comprising: estimating at least one parameter of interest of the earth formation using signals generated by at least one oriented receiver on a bottom hole assembly in response to energy generated by at least one oriented transmitter on the bottom hole assembly and information indicative of the alignment between the at least one oriented transmitter and the at least one oriented receiver, wherein the at least one oriented receiver includes one of: i) a single oriented receiver and ii) a plurality of collocated oriented receivers, and wherein the at least one oriented transmitter includes one of: i) a single oriented transmitter and ii) a plurality of collocated oriented transmitters.

Another embodiment according to the present disclosure includes an apparatus for conducting logging operations in a borehole penetrating an earth formation, comprising: a bottom hole assembly configured to be conveyed in the borehole; at least one oriented transmitter disposed on the bottom hole assembly and configured to transmit energy into the earth formation; at least one oriented receiver disposed on the bottom hole assembly and configured to receive a signal from the earth formation; at least one alignment sensor disposed on the bottom hole assembly and configured to receive alignment information, wherein the at least one oriented receiver includes one of: i) a single oriented receiver and ii) a plurality of collocated oriented receivers, and wherein the at least one oriented transmitter includes one of: i) a single oriented transmitter and ii) a plurality of collocated oriented transmitters; and at least one processor configured to: estimate at least one parameter of interest of the earth formation using information from the signals generated the at least one oriented receiver.

Another embodiment according to the present disclosure includes a non-transitory computer-readable medium product having stored thereon instructions that, when executed by at least one processor, cause the at least one processor to perform a method, the method comprising: estimating at least one parameter of interest of an earth formation using signals generated by at least one oriented receiver on a bottom hole assembly in response to energy generated by at least one oriented transmitter on the bottom hole assembly, and information indicative of the alignment between the at least one oriented transmitter and the at least one oriented receiver, wherein the at least one oriented receiver includes one of: i) a single oriented receiver and ii) a plurality of collocated oriented receivers, and wherein the at least one oriented transmitter includes one of: i) a single oriented transmitter and ii) a plurality of collocated oriented transmitters.

Another embodiment according to the present disclosure includes a method of conducting logging operations in a borehole penetrating an earth formation, comprising: estimating at least one parameter of interest of the earth formation using signals generated by at least one oriented receiver on a bottom hole assembly in response to energy generated by at least one oriented transmitter on the bottom hole assembly and information indicative of the alignment between the at least one transmitter and the at least one of the oriented receiver, wherein the at least one oriented receiver includes one of: i) a single oriented receiver and ii) a plurality of non-collocated oriented receivers, and wherein the at least one oriented transmitter includes one of: i) a single oriented transmitter and ii) a plurality of non-collocated oriented transmitters.

Another embodiment according to the present disclosure includes an apparatus for conducting logging operations in a borehole penetrating an earth formation, comprising: a bottom hole assembly configured to be conveyed in the borehole; at least one oriented transmitter disposed on the bottom hole assembly and configured to transmit energy into the earth formation; at least one oriented receiver disposed on the bottom hole assembly and configured to receive signals from the earth formation; at least one alignment sensor disposed on the bottom hole assembly and configured to receive alignment information, wherein the at least one oriented receiver includes one of: i) a single oriented receiver and ii) a plurality of non-collocated oriented receivers, and wherein the at least one oriented transmitter includes one of: i) a single oriented transmitter and ii) a plurality of non-collocated oriented transmitters; and at least one processor configured to: estimate at least one parameter of interest of the earth formation using information from the signals generated the at least one oriented receiver.

Another embodiment according to the present disclosure includes a non-transitory computer-readable medium product having stored thereon instructions that, when executed by at least one processor, cause the at least one processor to perform a method, the method comprising: estimating at least one parameter of interest of an earth formation using signals generated by at least one oriented receiver on a bottom hole assembly in response to energy generated by at least one oriented transmitter on the bottom hole assembly and information indicative of the alignment between the at least one transmitter and the at least one of the oriented receiver, wherein the at least one oriented receiver includes one of: i) a single oriented receiver and ii) a plurality of non-collocated oriented receivers, and wherein the at least one oriented transmitter includes one of: i) a single oriented transmitter and ii) a plurality of non-collocated oriented transmitters.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
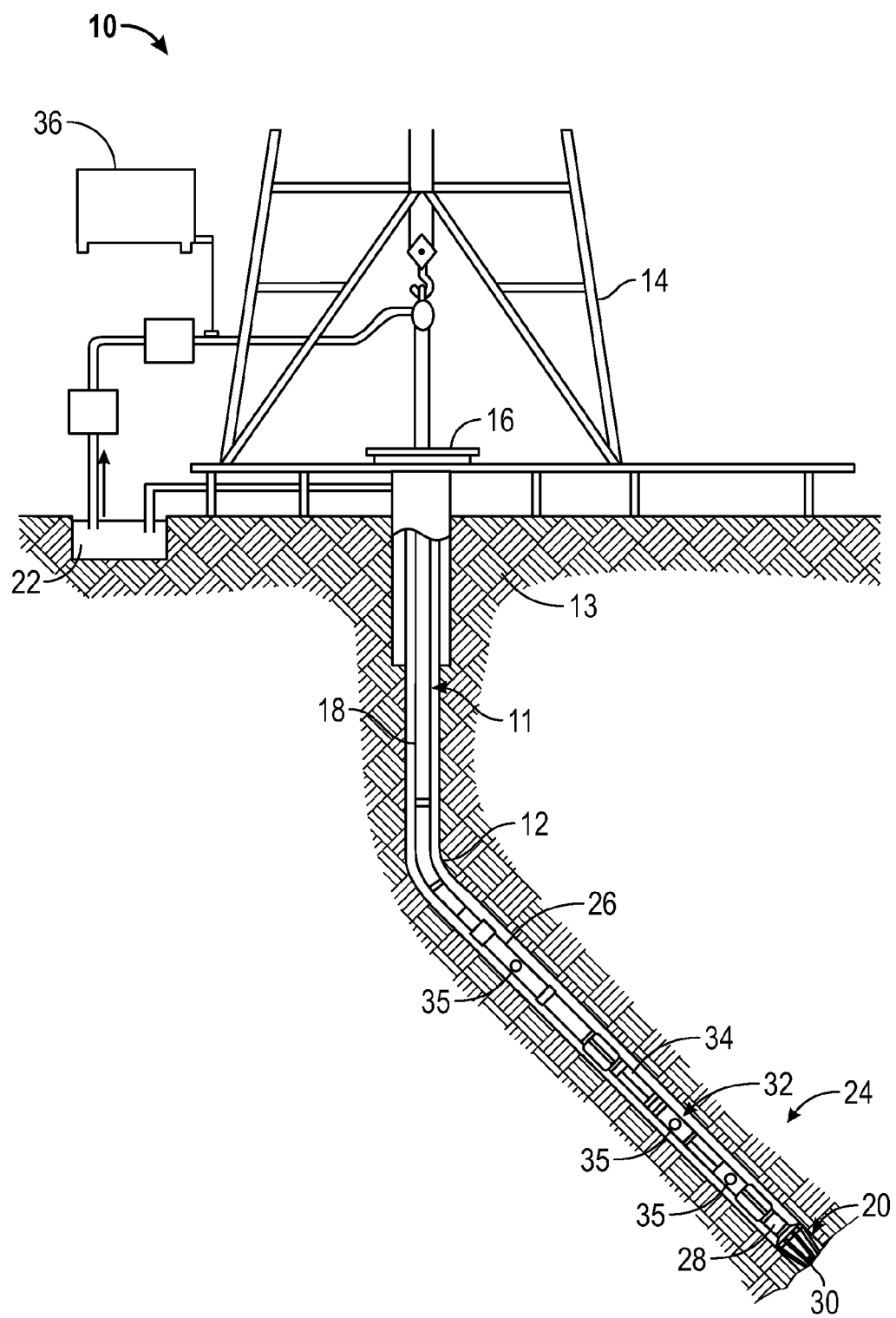
FIG. 1 shows a schematic of a bottom hole assembly (BHA) deployed in a wellbore along a drill string according to one embodiment of the present disclosure.

This disclosure generally relates to exploration for hydrocarbons involving electromagnetic investigations of a borehole penetrating an earth formation. These investigations may include estimating at least one parameter of interest of the earth formation and using additional alignment information to compensate for misalignment between transmitters and receivers, such as due to deformation of a carrier.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

FIG. 1 shows an exemplary embodiment of a well drilling, logging and/or geosteering system 10 includes a drillstring 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. As described herein, "formations" refer to the various features and materials that may be encountered in a subsurface environment and surround the borehole. The term "information" includes, but is not limited to, raw data, processed data, and signals.

In one embodiment, the system 10 includes a conventional derrick 14 that may supports a rotary table 16 that is rotated at a desired rotational speed. The drillstring 11 includes one or more drill pipe sections 18 that extend downward into the borehole 12 from the rotary table 16, and is connected to a drilling assembly 20. Drilling fluid or drilling mud 22 is pumped through the drillstring 11 and/or the borehole 12. The well drilling system 10 also includes a bottomhole assembly (BHA) 24. In one embodiment, a drill motor or mud motor 26 is coupled to the drilling assembly 20 and rotates the drilling assembly 20 when the drilling fluid 22 is passed through the mud motor 26 under pressure.

In one embodiment, the drilling assembly 20 includes a steering assembly including a shaft 28 connected to a drill bit 30. The shaft 28, which in one embodiment is coupled to the mud motor, is utilized in geosteering operations to steer the drill bit 30 and the drillstring 11 through the formation.

In one embodiment, the drilling assembly 20 is included in the bottomhole assembly (BHA) 24, which is disposable within the system 10 at or near the downhole portion of the drillstring 11. The system 10 includes any number of downhole tools 32 for various processes including formation drilling, geosteering, and formation evaluation (FE) for measuring versus depth and/or time one or more physical quantities in or around a borehole. The tool 32 may be included in or embodied as a BHA, drillstring component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

In one embodiment, one or more downhole components, such as the drillstring 11, the downhole tool 32, the drilling assembly 20 and the drill bit 30, include sensor devices 34 configured to measure various parameters of the formation and/or borehole. For example, one or more parameter sensors 34 (or sensor assemblies such as MWD subs) are configured for formation evaluation measurements and/or other parameters of interest (referred to herein as "evaluation parameters") relating to the formation, borehole, geophysical characteristics, borehole fluids and boundary conditions. These sensors 34 may include formation evaluation sensors (e.g., resistivity, dielectric constant, water saturation, porosity, density and permeability), sensors for measuring borehole parameters (e.g., borehole size, borehole inclination and azimuth, and borehole roughness), sensors for measuring geophysical parameters (e.g., acoustic velocity, acoustic travel time, electrical resistivity), sensors for measuring borehole fluid parameters (e.g., viscosity, density, clarity, rheology, pH level, and gas, oil and water contents), boundary condition sensors, and sensors for measuring physical and chemical properties of the borehole fluid.

The system 10 also includes sensors 35 for measuring force, operational and/or environmental parameters related to bending or other static and/or dynamic deformation of one or more downhole components. The sensors 35 are described collectively herein as "deformation sensors" and encompass any sensors, located at the surface and/or downhole, that provide measurements relating to bending or other deformation, static or dynamic, of a downhole component. Examples of deformation include deflection, rotation, strain, torsion and bending. Such sensors 35 provide data that is related to forces on the component (e.g., strain sensors, WOB sensors, TOB sensors) and are used to measure deformation or bending that could result in a change in position, alignment and/or orientation of one or more sensors 34. In one non-limiting embodiment, the sensors 35 may include one or more of: (i) a strain gauge, (ii) a transmitter oriented at a non-X, non-Z angle, (iii) a receiver oriented at a non-X, non-Z angle, (iv) a differential magnetometer, (v) a differential accelerometer, (vi) an optical sensor, and (vii) an optical fiber sensor.

For example, a distributed sensor system (DSS) is disposed at the drillstring 11 and BHA 24 includes a plurality of sensors 35. The sensors 35 perform measurements associated with forces on the drillstring that may result in deformation, and can thereby result in misalignment of one or more sensors 34. Non-limiting example of measurements performed by the sensors 35 include accelerations, velocities, distances, angles, forces, moments, and pressures. Sensors 35 may also be configured to measure environmental parameters such as temperature and pressure. In one non-limiting, the sensors 35 may be distributed throughout a drill string and tool (such as a drill bit) at the distal end of the drill string 11. In other embodiments, the sensors 35 may be configured to measure directional characteristics at various locations along the borehole 12. Examples of such directional characteristics include inclination and azimuth, curvature, strain, and bending moment.

Figure 2:
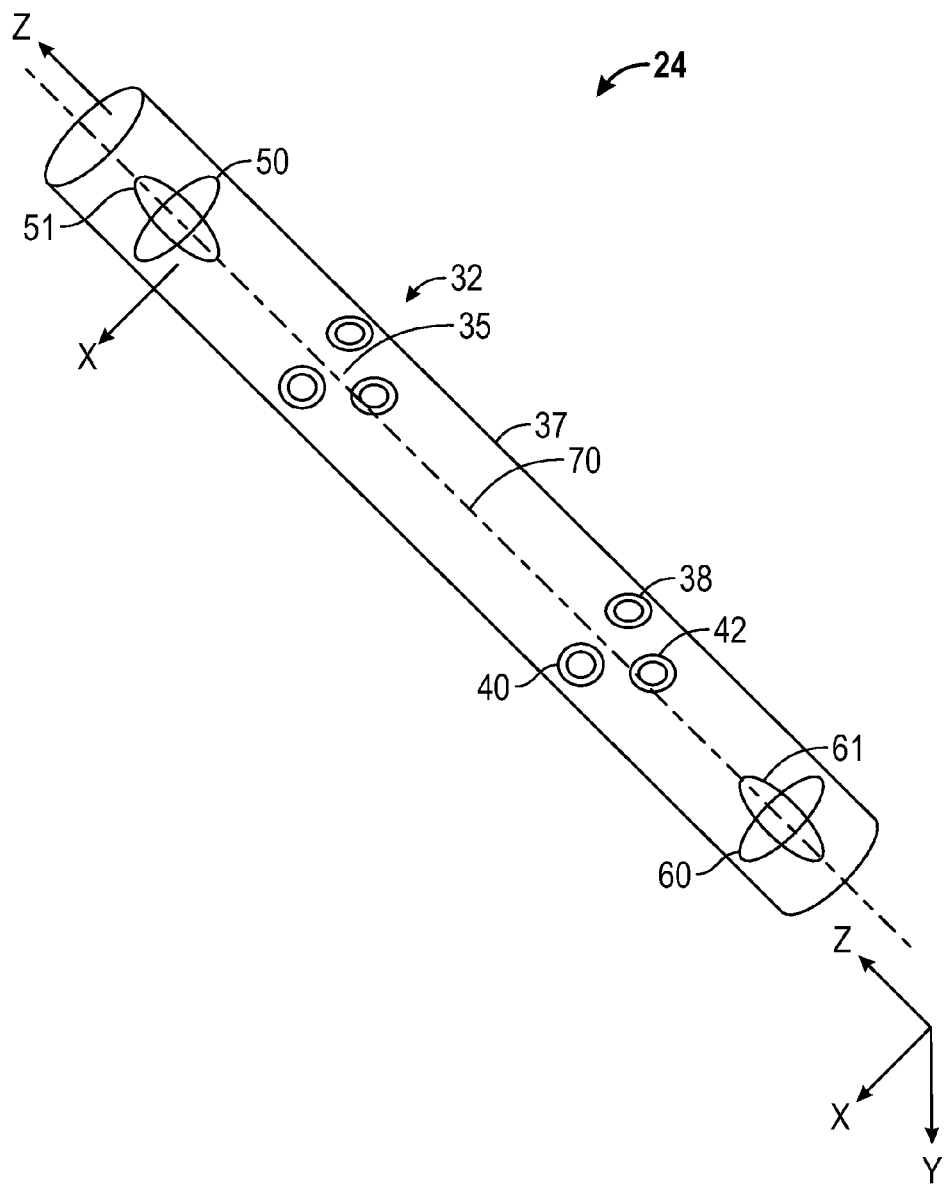
FIG. 2 shows a schematic close up of one embodiment of a resistivity tool on the BHA with deformation sensors and with collocated transmitters and collocated receivers configured for deployment in a wellbore according to one embodiment of the present disclosure.

FIG. 2 shows a downhole component, such as a drill pipe section or BHA 24 that includes a plurality of deformation sensors 35 incorporated into a drilling sensor sub 37 and arrayed along an axis of the drillstring portion. The BHA 24 has a longitudinal axis 70. This drilling sensor sub 37 may include sensors for measuring measure weight on bit (WOB), torque on bit, annulus and internal pressure, and annulus and instrument temperature. In this example, each of the sensors 35 includes one or more strain gauges 38, 40 and 42 for measuring strain, which can be used to calculate deformation characteristics such as curvature, bending tool face angle, and well tool face angle. Other non-limiting examples of sensors 35 include magnetometers and inclinometers configured to provide inclination data. The use of a plurality of deformation sensors 35 is exemplary and illustrative only, as some embodiments of the present disclosure may be realized with a single deformation sensor 35.

An exemplary orthogonal coordinate system includes a z-axis that corresponds to the longitudinal axis of the downhole component, and perpendicular x- and y-axes. The coordinate system indicates directions for expressing the deformation of the sub 37 in the borehole. In one embodiment, the sensors 35 are configured to take independent perpendicular bending moment measurements at selected cross-sectional locations of the tool 32. For example, the strain gauges 38 and 40 are configured to take bending moment measurements along the x-axis and y-axis, respectively.

Generally, some of the teachings herein are reduced to an algorithm that is stored on non-transitory machine-readable media. The algorithm is implemented by a computer or processor such as the surface processing unit 36 or the tool 32 and provides operators with desired output. For example, electronics in the tool 32 may store and process data downhole, or transmit data in real time to the surface processing unit 36 via wireline, or by any kind of telemetry such as mud pulse telemetry or wired pipes during a drilling or measurement-while-drilling (MWD) operation.

In one embodiment, the parameter sensors 34, deformation sensors 35 and/or other downhole components include and/or are configured to communicate with at least one processor to receive, measure and/or estimate directional and other characteristics of the downhole components, borehole and/or the formation. For example, the sensors 34, deformation sensors 35 and/or BHA 24 are equipped with transmission equipment to communicate with the at least one processor, such as a surface processing unit 36 or a downhole processor (not shown). Such transmission equipment may take any desired form, and different transmission media and connections may be used. Examples of connections include, but are not limited to, wired, fiber optic, acoustic, wireless connections and mud pulse telemetry.

The at least one processor may be configured to receive data and generate information such as a mathematical model for estimating or predicting bending or other deformation of various components. For example, the at least one processor may be configured to receive downhole data as well as additional data (e.g., from a user or database) such as borehole size and geometric data of borehole components such as component size/shape and material. In one embodiment, the surface processing unit 36 is configured as a surface drilling control unit which controls various drilling parameters such as rotary speed, weight-on-bit, drilling fluid flow parameters and others and records and displays real-time formation evaluation data. The surface processing unit 36, the tool 32 and/or other components may also include components as necessary to provide for storing and/or processing data collected from various sensors therein. Exemplary components include, without limitation, at least one processor, storage, memory, input devices, output devices and the like.

Since the drillstring 11 may bend within a borehole, transmitters 50, 51 and receivers 60, 61 that are disposed on the BHA 24 or otherwise along the drillstring 11 may undergo shifts in alignment at different positions within the borehole 12. Signals received by receivers 60, 61 due to energy emitted by transmitters 50, 51 may change due to a change in alignment of a transmitter-receiver pair (for example, transmitter 50—receiver 60). In each pair, the transmitter and receiver may be oriented orthogonal to one another. Transmitters 50, 51 and receivers 60, 61 may each include a directional antenna. Transmitters 50, 51 and/or receivers 60, 61 may be collocated. Herein, the term "collocated" refers to two or more transmitters/receivers that use intertwined coils or separate coils in such proximity as to behave a point transmitter/receiver as understood by one of skill in the art. Two receiver/transmitter positions may be considered collocated if the signals received, due to energy emitted by the transmitter(s), at the both positions are substantially identical within the selected measurement accuracy. Non-collocated transmitters/receivers are not intertwined and are separated by sufficient distance as to behave as individual transmitters/receivers as understood by one skill in the art. Thus, two receiver/transmitter positions may be considered non-collocated if signals received, due to energy emitted by the transmitter(s), at both positions are different within the selected measurement accuracy. In this non-limiting embodiment, transmitter 50 may be oriented in the Z-direction and transmitter 51 may be oriented in the X-direction. Correspondingly, receiver 60 may be oriented in the X-direction, and receiver 61 may be oriented in the Z-direction. The alignment between a transmitter 50, 51 and a receiver 60, 61 may be estimated based on the deformation of the drillstring 11, which may be estimated using one or more deformation sensors 35 disposed on the drillstring 11. The deformation sensors 35 may be positioned to provide information indicative of deformation along axes relevant to the orientation of the transmitters 50, 51 and receivers 60, 61. For example, the deformation direction can be estimated using deformation sensors 35 distributed around the circumference of the sub 37. While FIG. 2 shows the oriented transmitters 50, 51 and oriented receivers 60, 61 in an alternating Z-X-pattern, this is exemplary and illustrative only, as the transmitters and receivers may be oriented in any orientation combination including combinations with triaxial antenna such a Z-transmitter with an XYZ-receiver (not shown). In some embodiments, the oriented transmitters 50, 51 may include coils configured such that the coil(s) of transmitter 50 and transmitter 51 are wound around each other and/or spaced with such proximity as to be collocated as would be understood by one of skill in the art. Similarly, the oriented receivers 60, 61 may include coils configured such that the coil(s) of receiver 60 and receiver 61 are wound around each other and/or spaced with such proximity as to be collocated as would be understood by one of skill in the art. Some embodiments may use only a single transmitter and a single receiver.

In some embodiments, alignment information may be estimated using a radius of borehole direction change (such as local dogleg) from a measured bending moment. Dogleg severity is a measure of a change in direction of a borehole within a given length of the borehole. The dogleg severity may be stored as a function of bending moment. Precalculated values for the bending moment may be stored in a lookup table. Another lookup table may include precalculated values for a misalignment angle between at least one transmitter 50, 51 and its corresponding receiver 60, 61. The lookup table of misalignment angles may show misalignment angle as a function of dogleg severity. For a measured depth in the borehole 12, a local dogleg severity may be obtained from the bending moment measured by at least one deformation sensor 35 using the first lookup table. The local misalignment may be obtained from the local dogleg severity and using the second lookup table.

Figure 3:
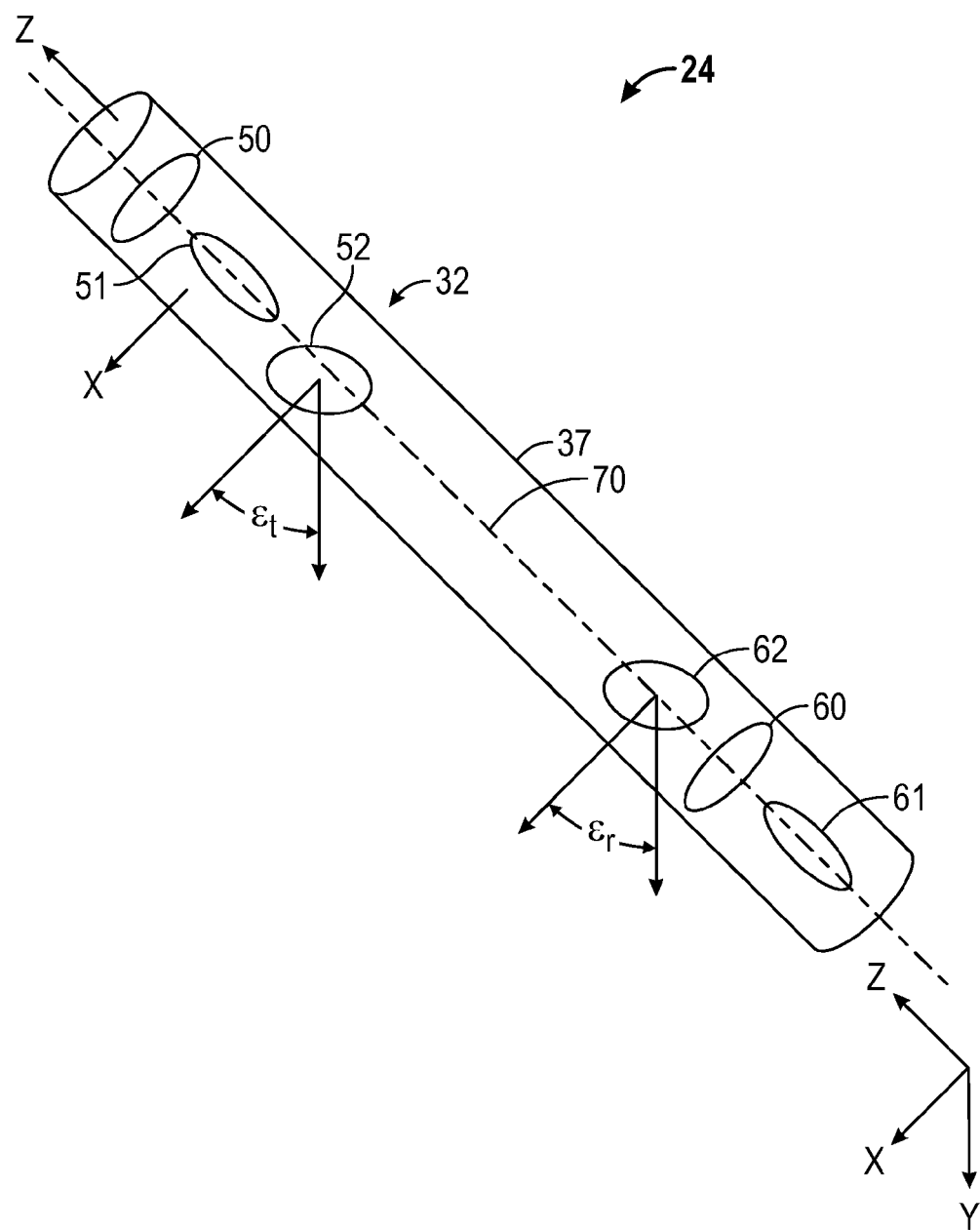
FIG. 3 shows a schematic close up of another embodiment of a resistivity tool on the BHA with a third transmitter configured for deployment in a wellbore according to one embodiment of the present disclosure.

FIG. 3 shows another embodiment according to the present disclosure, where a third transmitter 52 (or receiver 62), may be used instead of deformation sensors 35. Using the two pairs of oriented transmitters 50, 51 and oriented receivers 60, 61, oriented in the Z- and X-directions, respectively, a third transmitter 52 (or receiver 62) may be introduced at an angle $\in_t$ (or $\in_r$). In FIG. 3, angle $\in_t$ (or $\in_r$) is shown in the X-Y plane, however, this is exemplary and illustrative only, as angle $\in_t$ (or $\in_r$) may be oriented in any direction. In some embodiments, only the third transmitter 52 or only the third receiver 62 may be present.

Figure 4:
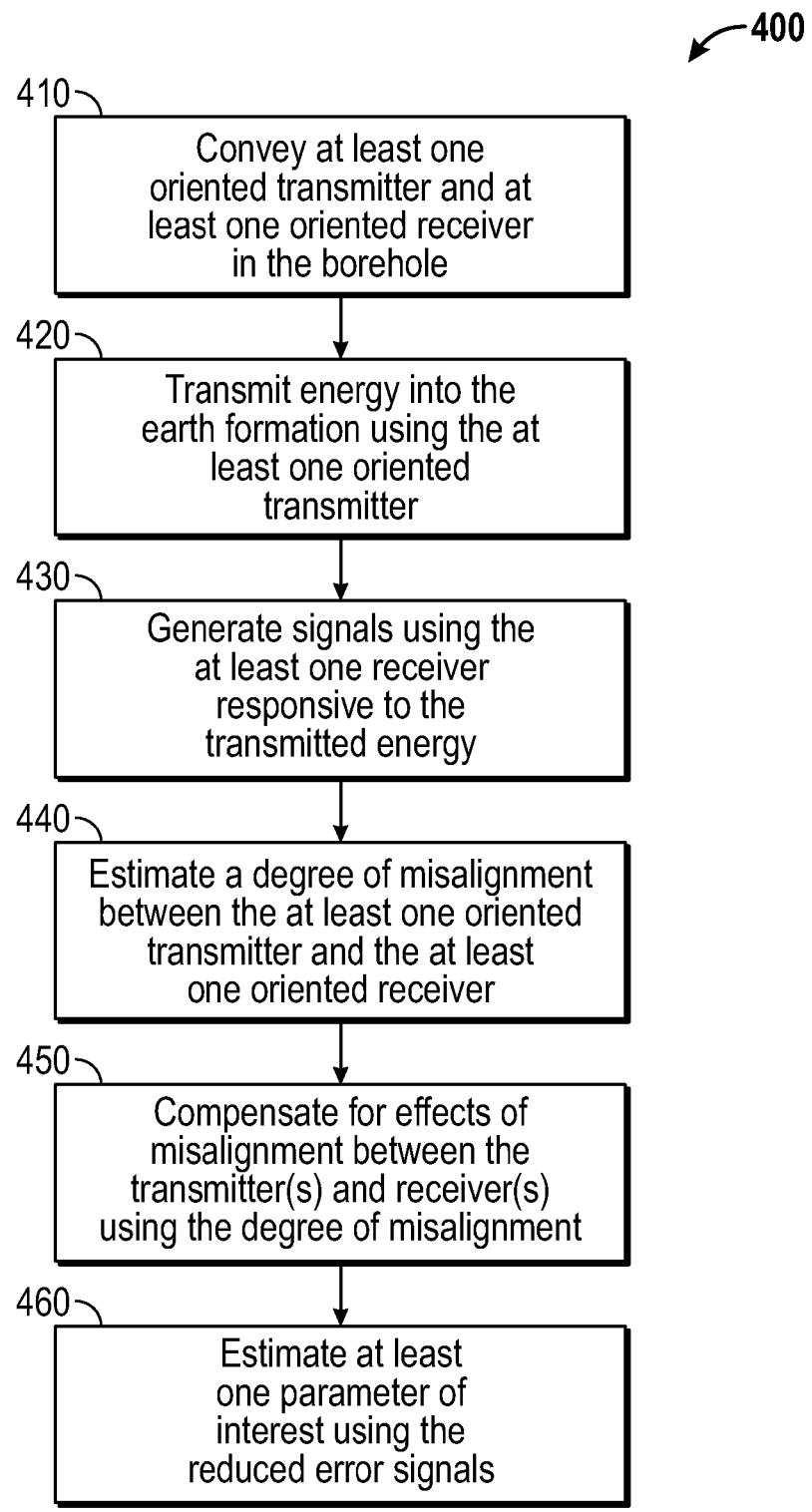
FIG. 4 shows a flow chart of a method for estimating at least one parameter of interest according to one embodiment of the present disclosure.

FIG. 4 shows a flow chart of a method 400 according to one embodiment for the present disclosure. In step 410, the oriented transmitters 50, 51 and oriented receivers 60, 61 may be conveyed in the borehole 12 along with one or more deformation sensors 35 (FIG. 2) and/or a third transmitter 52 (FIG. 3). The transmitters 50, 51 may be oriented substantially perpendicular to each other. Similarly, the receivers 60, 61 may be oriented substantially perpendicular to each other. In this example, the transmitters 50, 51 are oriented in the Z- and X-directions, and their corresponding receivers 60, 61 are oriented in the X- and Z-directions. In step 420, energy may be transmitted into the earth formation 13 using the oriented transmitters 50, 51. In step 430, the oriented receivers 60, 61 may generate signals indicative of the earth formation's response to the transmitted energy. The generated signals may be indicative of at least one resistivity property of the earth formation. In step 440, a difference in alignment between each of the oriented transmitters 50, 51 and substantially orthogonally aligned receiver 60, 61 may be estimated. In step 450, at least one processor may compensate for the effects of deformation of the BHA 24 on the receiver signals using the estimated difference in alignment. In step 460, at least one parameter of interest of the earth formation 13 may be estimated using the receiver signals after compensation.

Once the difference in alignment angles are estimated, signals generated by the receivers 60, 61 responsive to energy emitted by the transmitters 50, 51 may be modified to compensate for the misalignment between individual transmitters 50, 51 and receivers 60, 61.

In embodiments using one or more deformation sensors 35 (FIG. 2), compensating for deformation of the BHA 24 may include applying a set of algorithms using the estimated differences in alignment. Compensating for deformation may include compensating for misalignment due to an angular shift between the transmitters and receivers and an offset (e.g. out of axis) between the relative positions of the transmitters and receivers due to deformation of the BHA 24. The angular shift may be addressed with the following exemplary equations:

Amp ZZ measured=Amp ZZ true*cos(Deformation)+
    Amp ZX true*sin(Deformation)

Amp ZX measured=Amp ZZ true*sin(Deformation)+
    Amp ZX true*cos(Deformation)

Amp XZ measured=Amp XZ true*cos(Deformation)+
    Amp XX true*sin(Deformation)

Amp XX measured=Amp XZ true*sin(Deformation)+
    Amp XX true*cos(Deformation)

where, Amp AB is the amplitude of the signal from transmitter A at receiver B; X stands for cross receiver/transmitter; and Z stands for axial receivers/transmitters.

In embodiments using a third transmitter oriented at an angle $\in$ in the X-Z plane, compensation for deformation of the BHA 24 may include applying a set of algorithms using the estimated differences in alignment with the following exemplary equations:

Amp RX measured=Amp ZZ true*sin(Deformation)+
    Amp ZX true*cos(Deformation)

Amp RZ measured=Amp ZZ true*cos(Deformation)+
    Amp ZX true*sin(Deformation)

Amp RT measured=Amp ZZ true*sin(Deformation+
    $\in$)+Amp ZX true*cos(Deformation+$\in$)

where, Amp RB is the amplitude of the signal received at receiver R from transmitter B, X stands for the cross transmitter, Z stands for the axial transmitter, and T stands for the transmitter tilted at angle $\in_t$ (or $\in_r$). The three measurements (Amp RX measured, Amp RZ measured, and Amp RT measured) may be used to solve for Amp ZZ true, Amp ZX true, and Amp XX true.

In the event that a receiver becomes positioned out of axis, the following exemplary equation may be used to compensate:

Amp XZ measured=$(\vec{H}_{\beta,0}+\vec{H}_{off}+\vec{H}_i)\cdot\vec{s}$ where $\vec{H}_{\beta,0}$ is the magnetic field vector on the longitudinal axis 70, β is the angle of misalignment of the receiver, $\vec{H}_{off}$ is the magnetic field vector due to the off axis position of the receiver, $\vec{H}_i$ is the magnetic field vector due to an inhomogeneous part of the earth formation 13, and $\vec{s}$ is the sensitivity vector the receiver 60, 61. For small deformation angles β and a large distance to the remote bed (the application case), the field $\vec{H}_i$ created by the inhomogeneous medium may be approximately homogeneous at the antenna within the range of position variation caused by the deformation so the out of axis component, i.e. change of that field due to position change of the receiver, does not need to be considered.

The at least one parameter of interest of the earth formation may be estimated using the "true" amplitudes obtained after compensation for deformation of the BHA 24. The at least one parameter of interest may include, but is not limited to, one or more of: (i) complex (i.e. real and imaginary part of) conductivity/resistivity, (ii) dielectric constant, (iii) boundary distance, and (iv) remote bed resistivity (i.e. the resistivity of a layer behind a boundary). In some embodiments, XZ-signal strength and/or XZ-signal tool face direction may also be estimated. In some cases, deformation in a section of the borehole 12 may be estimated on a separate logging run from the logging run where the signals are generated by the receivers 60, 61.

Figure 5:
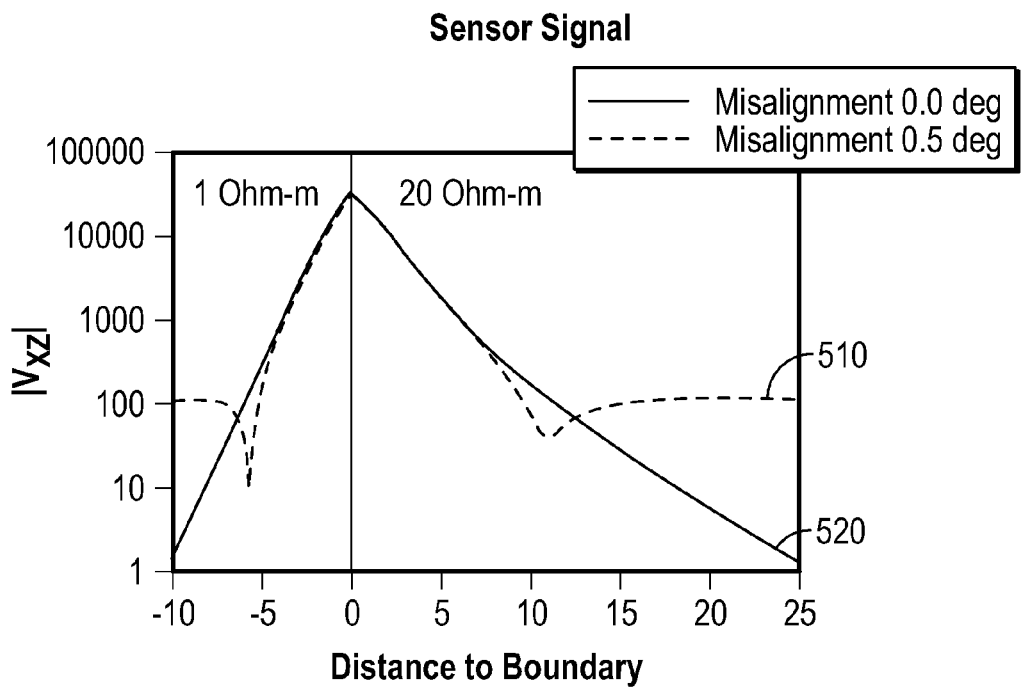
FIG. 5 shows a chart of amplitude vs. distance to boundary curves based on receiver signals before and after the compensation for deformation.

FIG. 5 shows a chart with curves representing signals generated by the receivers 60, 61 before and after deformation correction. Curve 510 represents the amplitude/boundary distance response from multi component propagation resistivity tool before deformation compensation. Curve 520 represents the amplitude/boundary distance response after compensation for alignment differences between oriented transmitters and oriented receivers.

Figure 6:
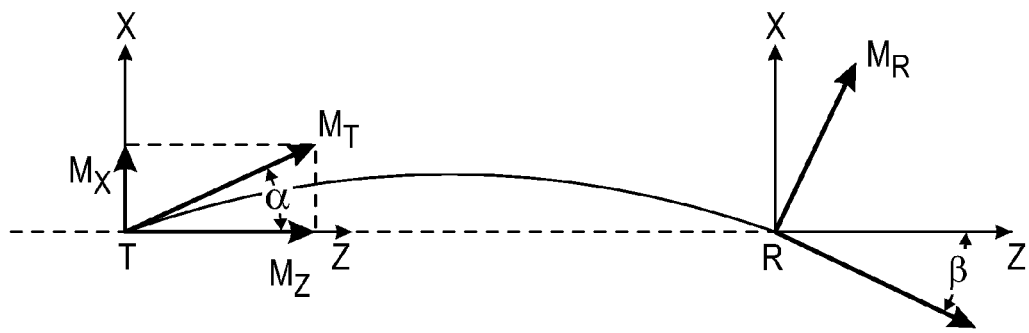
FIG. 6 shows a schematic of a transmitter-receiver combination with the associated magnetic moments according to one embodiment of the present disclosure.

FIG. 6 shows a schematic of a transmitter-receiver configuration with orientations of the magnetic moments. In some embodiments, bending effects may be seen in $H_{ZX}$ measurement (one or more of the real or imaginary components of $H_{ZX}$), where Z is the orientation of transmitter 50 substantially parallel to longitudinal axis 70 and X is the orientation of receiver 60 substantially perpendicular with respect to the tool axis 70. For example, if transmitter 50 is located in point T and the receiver 60 is located in point R, then bending may occur in a ZX-plane which is located at some azimuth $\phi_1$ with respect to preselected rotational orientation (for example upper side of the borehole 12) in the plane orthogonal to the axis of the borehole 12. Generally, the axis of borehole 12 may be substantially parallel with axis 70. Due to the bending effect, the magnetic moment of transmitter 50 at T may be misaligned with respect to the line connecting points T and R (TR line) by angle α, while the receiver 60 at R may be misaligned by angle β (it will be actually at the angle 90°-β with respect to TR line). In the coordinate system where Z-axis goes along TR line and X-axis goes up at 90°, the magnetic moment of transmitter 50 ($M_T$) may be represented by superposition of magnetic moments Mz and Mx where:

$$M_Z = M_T \cos\alpha;$$

$$M_X = M_T \sin\alpha; \tag{1}$$

These two magnetic moments Mz, Mx may generate a magnetic field at the receiver 60 that may be expressed as the following magnetic field components in the point R: MzHx, MzHy, MzHz, MxHx, MxHy, MxHz. The total magnetic field in the point R may be expressed as:

$$H_{ZX}^{bend} = M_Z H_X + M_Z H_Y + M_Z H_Z + M_X H_X + M_X H_Y + M_X H_X \tag{2}$$

The tool 32 may rotate in the borehole 12 at an angular frequency θ. This rotation may have no effect on the transmitter 50 due to the azimuthal symmetry of co-axial magnetic moment $M_T$, which means that Mz and Mx may be independent of the rotation of tool 32. The magnetic field components generated in point R may have the following projections into rotating orthogonal magnetic moment of the receiver 60 ($M_R$):

$$H_Z \sin\beta \cdot \cos(\theta - \phi_1);$$

$$H_X \cos\beta \cdot \cos(\theta - \phi_1);$$

$$H_Y \sin(\theta - \phi_1); \tag{3}$$

Eqns. 1 & 3 may be substituted into eqn. 2 to obtain:

$$H_{ZX}^{bend}(\theta) = \tag{4}$$
$$M_T \cos\alpha \cdot H_{ZX} \cos\beta \cdot \cos(\theta - \phi_1) + M_T \cos\alpha \cdot H_{ZY} \sin(\theta - \phi_1) +$$
$$M_T \cos\alpha \cdot H_{ZZ} \sin\beta \cdot \cos(\theta - \phi_1) + M_T \sin\alpha \cdot H_{XX} \cos\beta \cdot \cos(\theta - \phi_1) +$$
$$M_T \sin\alpha \cdot H_{XY} \sin(\theta - \phi_1) + M_T \sin\alpha \cdot H_{XZ} \sin\beta \cdot \cos(\theta - \phi_1)$$

To estimate the voltage in the receiver 60, the following equation may be used:

$$V_{ZX}^{bend} = -i\omega \cdot M_R \cdot H_{ZX}^{bend} \tag{5}$$

where ω is the angular frequency of the oscillating current in the transmitter 60.

If geosteering is performed with the tool 32 in horizontally layered formation, the measured signal may also be a function of $\phi_2$ which is the orientation of closest conductive layer in the plane orthogonal to the axis of borehole 12. In some embodiments, tool 32 may include an azimuthal resistivity tool.

In some embodiments, complications may be introduced by a dependence on $\phi_2$, however, eqn. 4 may be simplified by assuming:

i) bending angles α and β do not exceed 1° each for typical transmitter-receiver spacings (up to about 20 meters), then we can consider cos α=1 and cos β=1, sin α·sin β=0; and ii) only angular dependence due to the bending may be considered for components that have the direct field as the anomalous contribution from a remote bed is negligible when a boundary between layers is located relatively far from the tool, and iii) $H_{xy}$ is an anomalous component that may be neglected as it is multiplied by sin α and does not have a direct field.

Modifying eqn. 4 using the above assumptions may yield an equation as follows:

$$H_{ZX}^{bend}(\theta) = M_T H_{ZX}(\phi_2)\cos(\theta - \phi_1) + M_T H_{ZY}(\phi_2)\sin(\theta - \phi_1) + M_T H_{ZZ} \sin\beta \cdot \cos(\theta - \phi_1) + M_T \sin\alpha \cdot H_{XX} \cos(\theta - \phi_1) \tag{6}$$

Combining the first two terms in eqn. 6 may yield:

$$H_{ZX}^{bend}(\theta) = M_T H_{ZX} \cos(\theta - \phi_2) + (M_T \sin\alpha \cdot H_{XX} + M_T H_{ZZ} \sin\beta)\cos(\theta - \phi_1) \tag{7}$$

where, as described above, $\phi_1$ may be the phase related to the azimuth of the bending and $\phi_2$ may be the phase related to the orientation of closest conductive layer.

The sum of two sinusoids with the same frequency is also is a sinusoid so eqn. 7 may be rewritten as:

$$H_{ZX}^{bend} \cos(\theta - \phi_0) = M_T H_{ZX} \cos(\theta - \phi_2) + (M_T H_{XX} \sin\alpha + M_T H_{ZZ} \sin\beta)\cos(\theta - \phi_1) \tag{8}$$

where $\phi_0$ is the phase of the measured combined signal.

In eqn. 8 the following parameters may be known: $H_{ZX}^{bend}$—magnitude of the measured signal; $\omega_0$—the rotational phase of the measured signal; $\alpha$, $\beta$—the bending angles, and $\phi_1$—the phase related to the bending azimuth. In some embodiments, sources of bending information may include, but are not limited to, one or more of: i) strain sensor measurements and ii) multi-frequency focusing measurements.

Unknown parameters may include: $H_{ZX}$—amplitude of the cross-component (signal that we actually need); $\phi_2$—azimuth of closest conductive layer, $H_{ZZ}$, and $H_{XX}$—main component signals.

While the above embodiment is described in terms of a Z-transmitter and X-receiver, one of skill in the art with the benefit of this disclosure would recognize that the equations may be modified for use with an X-transmitter and a Z-receiver.

When tool 32 includes multiple transmitters 50, 51 and/or multiple receivers 60, 61, the transmitters 50, 51 and/or receivers 60, 61 may be collocated. In the case of collocated multi-component measurements $H_{ZZ}$, $H_{XX}$ signals may be estimated from measurements and $H_{ZX}$ from eqn. 8 to yield:

$$M_T H_{ZX} \cos(\theta-\phi_2) = H_{ZX}^{bend} \cos(\theta-\phi_0) - (M_T H_{XX} \sin \alpha + M_T H_{ZZ} \sin \beta) \cos(\theta-\phi_1) \quad (9)$$

However, transmitters 50, 51 and/or receivers 60, 61 may be spaced sufficiently to be considered non-collocated. In this case, eqn. 8 may be incorporated into an inversion by constructing a "penalty" function to correct for differences introduced by the non-collocation of the transmitters/receivers. Inversion techniques that may be used include, but are not limited to, one or more of: i) trial and error, ii) gradient optimization, and iii) simplex-based optimization. The inversion technique may be selected based on the complexity of the earth model used for the formation, speed of direct solver for a synthetic field, or other considerations known to one of ordinary skill in the art. The penalty function may be constructed as follows:

$$F_{cost} = \left\| \frac{H^{synthetic}(\alpha, \beta, \varphi_1, \varphi_2) - H^{measured}}{Err} \right\| + \text{regularization terms} \quad (10)$$

where Err may be a characterization of tool measurement accuracy and noise level; regularization terms may include constraints on parameters, terms responsible for faster convergence, and/or a penalty value based on a degree of variance from an expected solution; and $F_{cost}$ is the penalty function to be minimized in the inversion.

The measured values may be $H_{ZX}^{bend}$ and $\phi_0$. From the measured values, synthetic values ($H_{ZX}$, $H_{ZZ}$, $H_{XX}$, and $\phi_2$) may be recalculating in the each step of an optimization using a forward modeling algorithm. The bending parameters ($\alpha$, $\beta$, $\phi_1$) may be considered to be known, but in principle, may be included as unknowns in the inversion algorithm. Typically, there are several independent measurements available for use in the inversion, including, but not limited to, one or more of: i) real components of the voltages (signals) at different frequencies, ii) imaginary components of the voltages at different frequencies, iii) real components of the voltages at multiple depth points/intervals, and iv) imaginary components of the voltages at multiple depth points/intervals.

In some cases, the bending azimuth may be about the same as the orientation to the conductive bed, especially if the objective is to steer either to or from the bed. When the bending azimuth is the about the same orientation to the conductive bed, the phases $\phi_0$, $\phi_1$, $\phi_2$ may be considered equal:

$$H_{ZX}^{bend} = M_T H_{ZX} + M_T H_{XX} \sin \alpha + M_T H_{ZZ} \sin \beta \quad (11)$$

Figure 7:
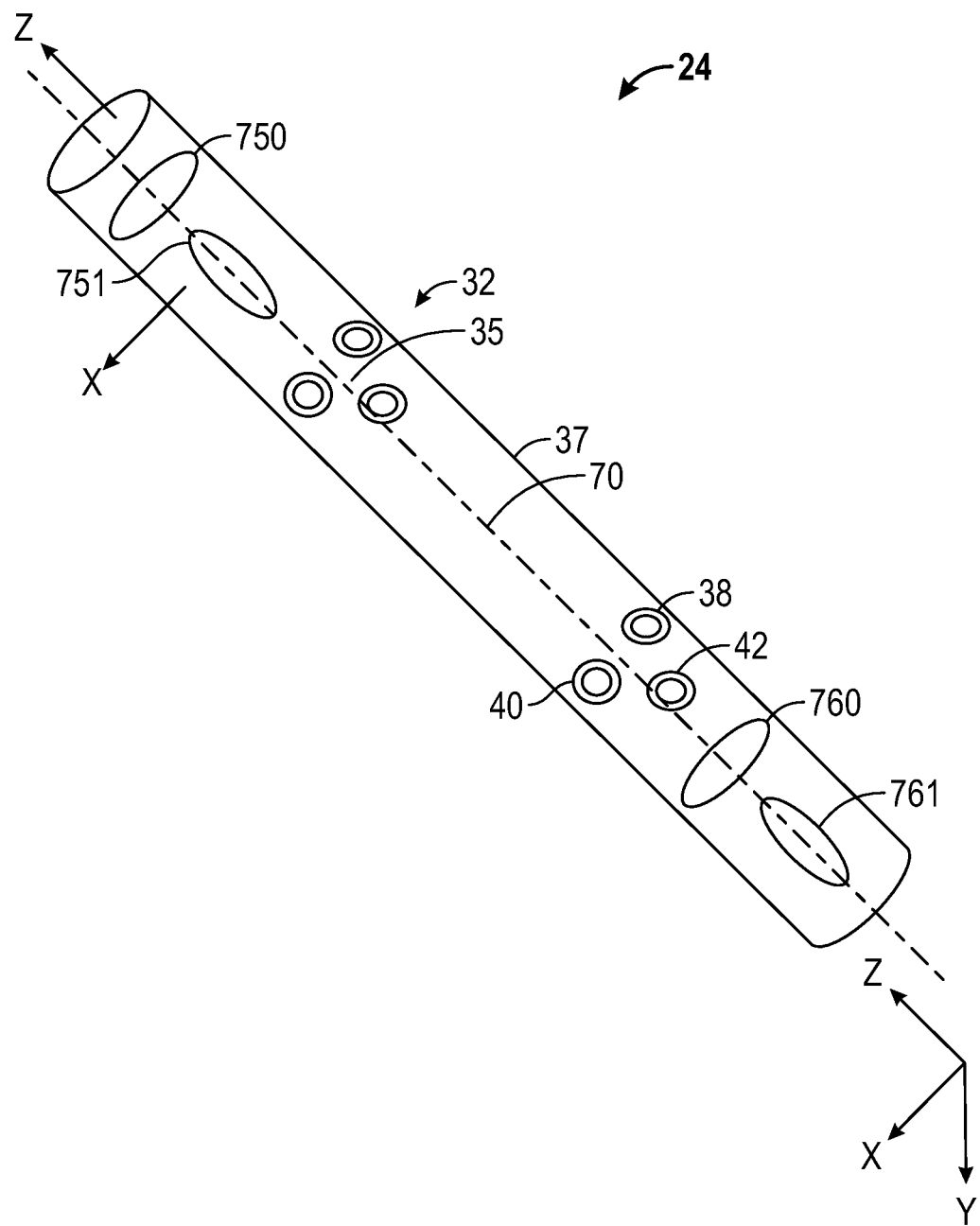
FIG. 7 shows a schematic close up of another embodiment of a resistivity tool on the BHA with non-collocated transmitters and non-collocated receivers configured for deployment in a wellbore according to one embodiment of the present disclosure.

FIG. 7 shows a BHA 24 similar to FIG. 2, however, the oriented transmitters 750, 751 are non-collocated and the oriented receivers 760, 761 are non-collocated.

Figure 8:
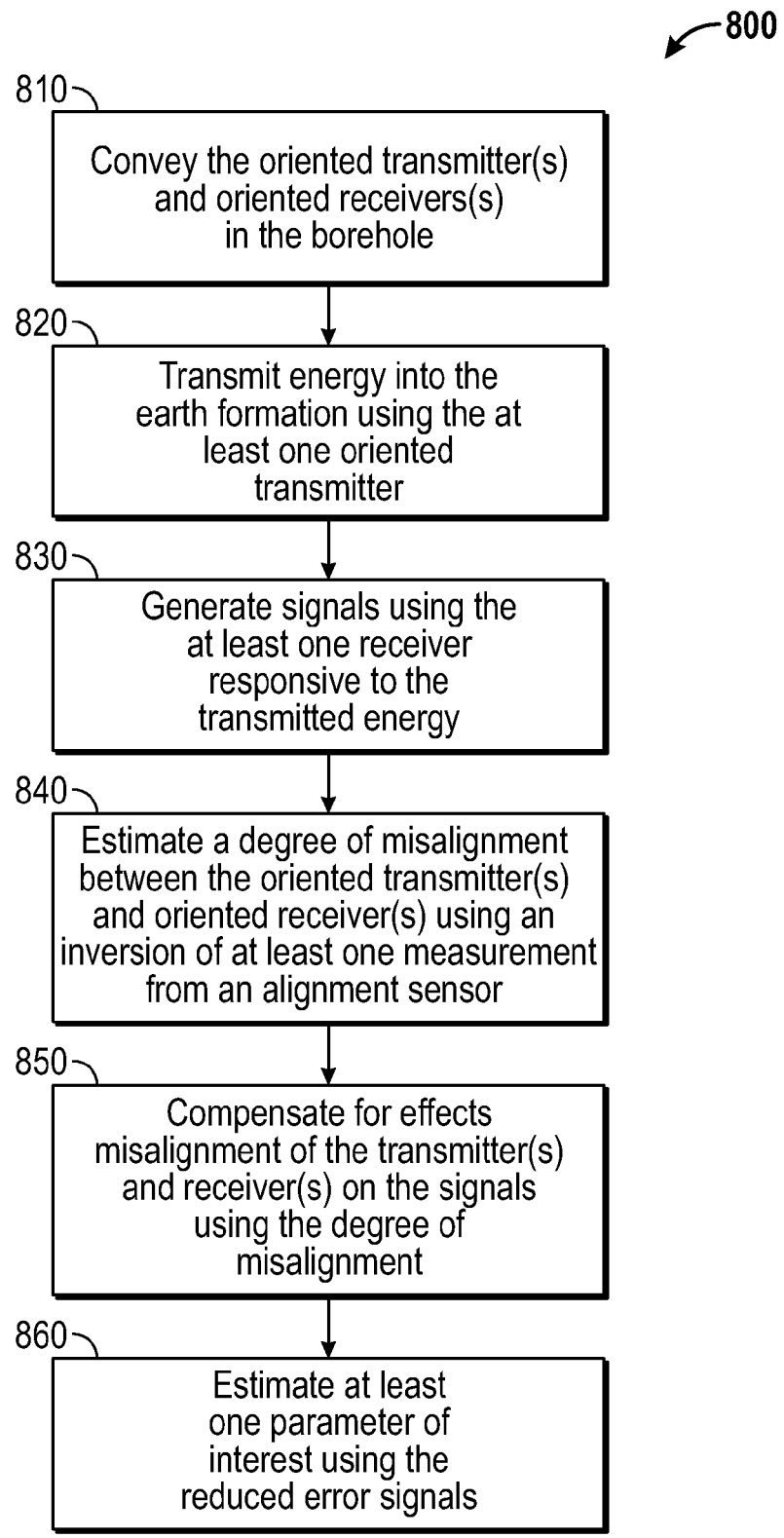
FIG. 8 shows a flow chart of a method for estimating at least one parameter of interest according to another embodiment of the present disclosure.

FIG. 8 shows a flow chart of a method 800 according to one embodiment for the present disclosure. In step 810, the oriented transmitters 750, 751 and oriented receivers 760, 761 may be conveyed in the borehole 12. The BHA 24 may include one or more alignment sensors, such as deformation sensors 35 (FIG. 7) and a third transmitter 52 (FIG. 3). The transmitters 750, 751 may be oriented substantially perpendicular to each other. Similarly, the receivers 760, 761 may be oriented substantially perpendicular to each other. In this example, the transmitters 750, 751 are oriented in the Z- and X-directions, and their corresponding receivers 760, 761 are oriented in the X- and Z-directions. In step 820, energy may be transmitted into the earth formation 13 using the oriented transmitters 750, 751. In step 830, the oriented receivers 760, 761 may generate signals indicative of the earth formation's response to the transmitted energy. The generated signals may be indicative of at least one resistivity property of the earth formation. In step 840, a difference in alignment between each of the oriented transmitters 750, 751 and each of the corresponding substantially orthogonally aligned receivers 760, 761 may be estimated using an inversion of at least one measurement from at least one alignment sensor 35. In some embodiments, the alignment information may be estimated using an inversion of at least one measurement based on multi-frequency focusing information. The inversion may include inverting a bending correction equation, such as eqn. 8. In step 850, at least one processor may compensate for the effects of deformation of the BHA 24 on the receiver signals using the estimated difference in alignment. In step 860, at least one parameter of interest of the earth formation 13 may be estimated using the receiver signals after compensation.

Implicit in the processing of the data is the use of a computer program implemented on a suitable non-transitory machine-readable medium that enables the processor to perform the control and processing. The term processor as used in this application is intended to include such devices as field programmable gate arrays (FPGAs). The non-transitory machine-readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the one mode embodiments of the disclosure, various modifications will be apparent to those skilled in the art. It is intended that all variations be embraced by the foregoing disclosure.

What is claimed is:

1. A method of conducting logging operations in a borehole penetrating an earth formation, comprising:
   estimating alignment information indicative of an angular shift between at least one oriented transmitter on a bottom hole assembly (BHA) and at least one oriented receiver on the BHA using measurements of deformation of the BHA from at least one deformation sensor;
   using the alignment information to compensate for effects of misalignment between the at least one oriented transmitter and the at least one oriented receiver on signals generated by the at least one oriented receiver in response to energy generated by the at least one oriented transmitter, the compensation comprising applying a compensation algorithm to the signals generated by the at least one oriented receiver; and estimating at least one parameter of interest of the earth formation using the compensation, wherein the at least one deformation sensor includes at least one of: (i) a strain gauge, (ii) a transmitter oriented at a non-X, non-Z angle, (iii) a receiver oriented at a non-X, non-Z angle, (iv) a magnetometer, (v) an accelerometer, (vi) a distance sensor, (vii) an optical sensor, and (viii) an optical fiber sensor.

2. The method of claim 1, wherein estimating the at least one parameter of interest comprises:

generating the signals using the at least one oriented receiver.

3. The method of claim 1, wherein the at least one deformation sensor includes at least one of: (i) the magnetometer, and (ii) the accelerometer; the magnetometer comprising a differential magnetometer, and the accelerometer comprising a differential accelerometer.

4. The method of claim 1, wherein estimating the alignment information comprises:

using a lookup table relating bending moment measurements to dogleg severity; and using a lookup table relating dogleg severity to misalignment angles.

5. The method of claim 1, wherein the signals are indicative of at least one resistivity property of the earth formation.

6. The method of claim 1, wherein the at least one parameter of interest includes at least one of: (i) complex conductivity/resistivity, (ii) dielectric constant, (iii) boundary distance, and (iv) remote bed resistivity.

7. The method of claim 1, further comprising:

conveying the at least one transmitter and at least one receiver in the borehole.

8. An apparatus for conducting logging operations in a borehole penetrating an earth formation, comprising:

a bottom hole assembly (BHA) configured to be conveyed in the borehole;

at least one oriented transmitter disposed on the BHA and configured to transmit energy into the earth formation;

at least one oriented receiver disposed on the BHA and configured to receive a signal from the earth formation;

at least one deformation sensor disposed on the BHA and configured to receive alignment information, wherein the at least one deformation sensor includes at least one of: (i) a strain gauge, (ii) a transmitter oriented at a non-X, non-Z angle, (iii) a receiver oriented at a non-X, non-Z angle, (iv) a magnetometer, (v) an accelerometer, (vi) a distance sensor, (vii) an optical sensor, and (viii) an optical fiber sensor; and at least one processor configured to:

estimate alignment information indicative of an angular shift between the at least one oriented transmitter on the BHA and the at least one oriented receiver on the BHA using measurements of deformation of the BHA from the at least one deformation sensor, use the alignment information to compensate for effects of misalignment between the at least one oriented transmitter and the at least one oriented receiver on signals generated by the at least one oriented receiver in response to energy generated by the at least one oriented transmitter, the compensation comprising applying a compensation algorithm to the signals generated by the at least one oriented receiver; and estimate at least one parameter of interest of the earth formation using the compensation.

9. The apparatus of claim 8, wherein each of the at least one receiver and the at least one transmitter includes at least one coil.

10. The apparatus of claim 8, wherein the at least one processor is further configured to:

use a lookup table relating bending moment measurements to dogleg severity; and use a lookup table relating dogleg severity to misalignment angles.

11. The apparatus of claim 8, wherein the at least one deformation sensor includes at least one of: (i) the magnetometer, and (ii) the accelerometer; the magnetometer comprising a differential magnetometer, and the accelerometer comprising a differential accelerometer.

12. The apparatus of claim 11, wherein the at least one strain gauge is disposed on the carrier at a location between the at least one oriented receiver and the at least one oriented transmitter.

13. The apparatus of claim 8, wherein the signals are indicative of a resistivity property of the earth formation.

14. The apparatus of claim 8, wherein the at least one parameter of interest includes at least one of: (i) complex conductivity/resistivity, (ii) dielectric constant, (iii) boundary distance, and (iv) remote bed resistivity.

15. A non-transitory computer-readable medium product having stored thereon instructions that, when executed by at least one processor, cause the at least one processor to perform a method of conducting logging operations in a borehole penetrating an earth formation, the method comprising:

estimating alignment information indicative of an angular shift between at least one oriented transmitter on a bottom hole assembly (BHA) and at least one oriented receiver on the BHA using measurements of deformation of the BHA from at least one deformation sensor;

using the alignment information to compensate for effects of misalignment between the at least one oriented transmitter and the at least one oriented receiver on signals generated by the at least one oriented receiver in response to energy generated by the at least one oriented transmitter, the compensation comprising applying a compensation algorithm to the signals generated by the at least one oriented receiver; and estimating at least one parameter of interest of the earth formation using the compensation, wherein the at least one deformation sensor includes at least one of: (i) a strain gauge, (ii) a transmitter oriented at a non-X, non-Z angle, (iii) a receiver oriented at a non-X, non-Z angle, (iv) a magnetometer, (v) an accelerometer, (vi) a distance sensor, (vii) an optical sensor, and (viii) an optical fiber sensor.

16. The non-transitory computer-readable medium product of claim 15 further comprising at least one of: (i) a ROM, (ii) an EPROM, (iii) an EEPROM, (iv) a flash memory, and (v) an optical disk.

* * * * *